(12) United States Patent
Ostendarp

(10) Patent No.: US 7,823,488 B2
(45) Date of Patent: Nov. 2, 2010

(54) DEVICE FOR PRODUCING MICROSTRUCTURES

(75) Inventor: Heinrich Ostendarp, Gruenenplan (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/584,391

(22) Filed: Oct. 20, 2006

(65) Prior Publication Data

US 2007/0095175 A1    May 3, 2007

Related U.S. Application Data

(63) Continuation of application No. PCT/EP2005/003860, filed on Apr. 13, 2005.

(30) Foreign Application Priority Data

Apr. 23, 2004  (DE) .................... 10 2004 020 990
Jul. 28, 2004   (DE) .................... 20 2004 011 815 U

(51) Int. Cl.
   *B23Q 5/22*   (2006.01)
   *B26D 1/04*   (2006.01)

(52) U.S. Cl. .................. 82/118; 82/11.5; 82/117

(58) Field of Classification Search ............. 82/117, 82/118, 71, 157, 173, 11–11.5; 83/76.1
   See application file for complete search history.

(56) References Cited

U.S. PATENT DOCUMENTS

| | | | |
|---|---|---|---|
| 5,404,680 A | 4/1995 | Mizuguchi et al. | |
| 5,467,675 A | 11/1995 | Dow et al. | |
| 6,227,085 B1 * | 5/2001 | Vasquez, Jr. ............ | 82/163 |
| 6,583,637 B2 * | 6/2003 | Fukunaga et al. ........ | 324/755 |
| 6,785,080 B1 * | 8/2004 | Sun et al. .............. | 360/75 |
| 2004/0024487 A1 | 2/2004 | Uhlich | |
| 2004/0140415 A1 * | 7/2004 | Watson ................ | 248/560 |
| 2007/0101836 A1 * | 5/2007 | Ostendarp ............. | 82/1.11 |

FOREIGN PATENT DOCUMENTS

| | | |
|---|---|---|
| DE | 101 26 039 A1 | 12/2002 |
| EP | 0 402 011 | 12/1990 |
| EP | 0 476 678 A2 | 3/1992 |
| EP | 0 439 425 B1 | 4/1993 |
| GB | 2 114 478 A | 8/1983 |
| GB | 2 314 452 A | 12/1997 |
| WO | WO 96/03256 | 2/1996 |
| WO | WO 01/32419 A1 | 5/2001 |
| WO | WO 03/101666 A2 | 12/2003 |

* cited by examiner

*Primary Examiner*—Boyer D Ashley
*Assistant Examiner*—Sara Addisu
(74) *Attorney, Agent, or Firm*—Harness, Dickey & Pierce, P.L.C.

(57) ABSTRACT

The invention discloses a device and a method for producing microstructures with a spindle, which is adapted to be driven for rotation about its longitudinal axis and which is provided with a fixture for clamping a workpiece, having an actuator provided with a fast drive, in particular a piezo drive, adapted to produce fast movement of a tool in a direction substantially perpendicular to the workpiece surface, which actuator can be positioned along a workpiece surface to be worked with the aid of an additional drive adapted to produce a linear feed motion in a first direction, the fast drive being coupled with the tool via guide means that allow feeding of the tool in axial direction of the fast drive, against the action of a restoring force, and that is highly rigid in a plane perpendicular to that direction. The control technology used permits microstructures to be produced precisely and reproducibly utilizing the dynamic properties of the system.

23 Claims, 10 Drawing Sheets

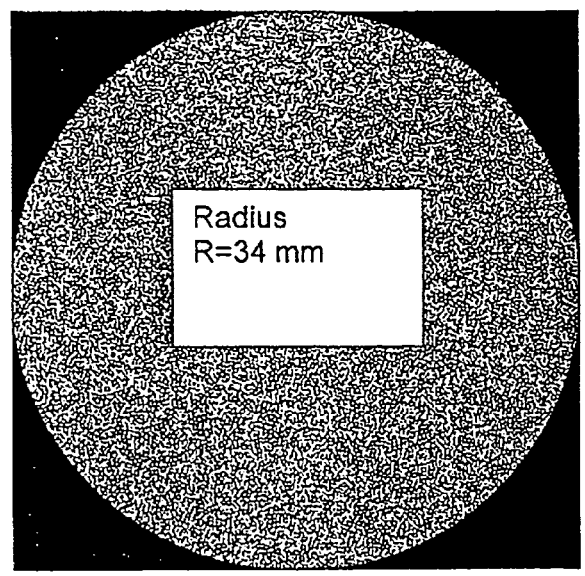
Fig. 7
Surface spectrum over one periphery step
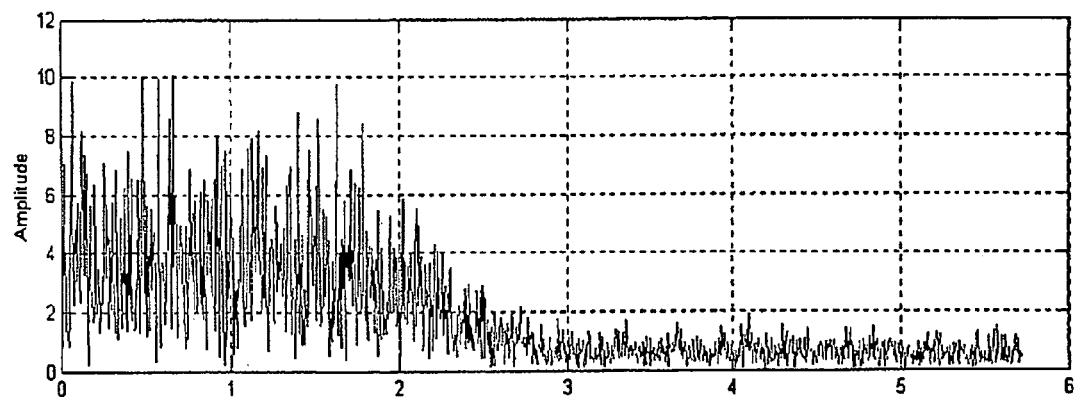
Spatial frequency in periods per mm
Surface spectrum over one peripheral step
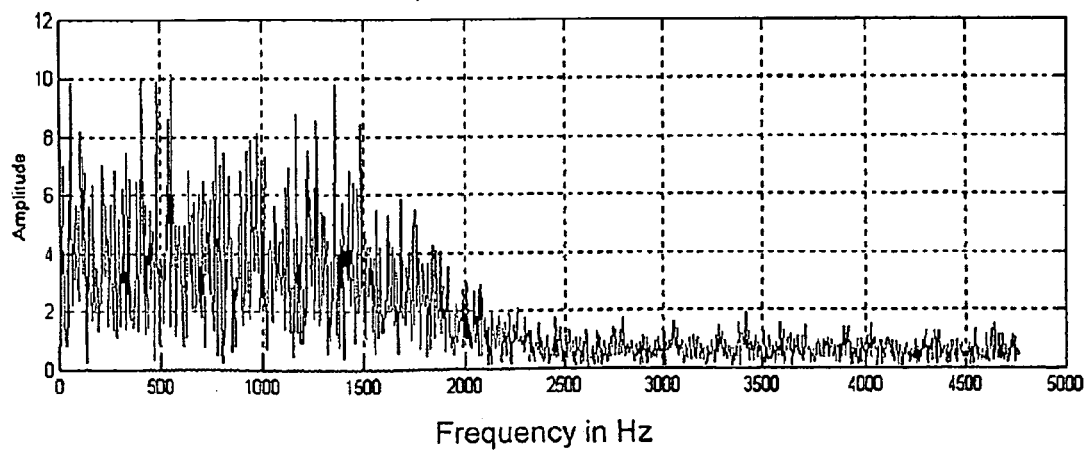
Frequency in Hz

DEVICE FOR PRODUCING MICROSTRUCTURES

CROSS REFERENCES TO RELATED APPLICATIONS

This application is a continuation of International Patent Application PCT/EP2005/003860, filed on Apr. 13, 2005 designating the U.S., which International Patent Application has been published in German language and claims priority of German patent application 10 2005 020 990.1 filed on Apr. 23, 2004 and of German utility model application 20 2004 011 815.7, filed on Jul. 28, 2004. The entire contents of these priority applications are incorporated herein by reference.

BACKGROUND OF THE INVENTION

The present invention relates to a device for producing microstructures with a spindle, which is adapted to be driven for rotation about its longitudinal axis and which is provided with a fixture for clamping a workpiece, having an actuator provided with a fast drive adapted to produce fast movement of a tool in a direction substantially perpendicular to a workpiece surface, which actuator can be positioned along a workpiece surface to be worked with the aid of an additional drive adapted to produce a linear feed motion in a first direction.

The invention further relates to an actuator suited for a device of that kind.

Finally, the invention relates to a method for producing a microstructured surface on a workpiece which can be rotated by a spindle using a tool that can be driven by an actuator and can be positioned in linear direction along a workpiece by means of a drive and can be moved by the actuator toward the workpiece surface in perpendicular direction relative to that linear direction.

A device and a method of the described kind are known from EP 0 439 425 B1.

The known method and the known device are used for producing contact lenses by a turning process. According to that process, a blank for a contact lens to be worked is mounted on a spindle. The workpiece, being rotationally driven by the spindle, can be worked by a turning tool which is positioned with the aid of a piezo drive. The turning machine comprises a column-like swivel head seated for pivotal movement about a pivot axes. A carriage guide is mounted on the swivel head. The carriage guide serves to guide a tool carriage in linear and radial direction relative to the pivot axis of the swivel head. A tool holder for the turning tool, preferably in the form of a turning diamond is supported on the tool carriage. For fast feed of the turning tool about the pivot axis of the swivel head, the tool carriage can be moved along the carriage guide by means of a motor drive. For fine positioning of the turning tool, a piezo drive is provided which may consist of two piezo translation means. While a first piezo translation means allows a movement to be performed in the direction of the carriage guide, a second piezo translation means is adapted to permit movement perpendicular to that first movement. The positioning movements of the piezo translation means may be controlled in response to the angle of rotation of the spindle about the spindle axis.

This arrangement permits highly precise surface working of lenses by a diamond cutter, and permits even rotationally non-symmetrical surfaces to be produced.

Similar devices for producing rotationally non-symmetrical surfaces by turning with the aid of a piezo drive have been known, for example, from U.S. Pat. No. 5,467,675 or GB 2 314 452 A.

Although the known devices and the known methods allow fine-structure surface working using diamond tools, such devices and methods, due to inadequate dynamic properties, are not suited for working very hard metal materials with high precision. Such materials are required, for example, as mold materials for the production of lenses by hot-pressing. The materials in question may, for example, be hard alloys. In the production of lenses for illumination purposes, which are used in spotlights known as poly-ellipsoid spotlights (PES spotlights) it is, for example, necessary to provide such molds with very specific microstructures which are then transferred to the respective lenses during the hot-pressing process. The microstructures serve as micro-optical components in the lenses so produced in order to meet given predefined light intensity distribution characteristics for the spotlight.

The production of such molds, consisting of a hard alloy or of cast iron, for example, has been possible to this day in the envisaged form only with the aid of geometrically uncertain processes. The molds are initially worked in the macroscopic form of the respective lenses by turning, where after the mold surface is polished, if necessary. Thereafter, the areas of the mold from which scattering centers are to be created on the lenses to be produced are produced by a number of operations, for example by a corundum blasting process in which masks are employed to cover those areas on which no microstructures are to be produced in that way. The blasting process is then followed, in part, by a two-dimensional after-treatment. Thus, for producing such a mold, numerous manual operations are required, which means that extremely time-consuming and expensive working is necessary to produce the desired surface structure. In addition, such a sequence of operations is highly susceptible to errors and faults which has an adverse influence on the reproducibility of the given light intensity distribution characteristics.

The before-mentioned known devices with piezo drives are not suited for such shaping operations, lacking the mechanical stability required for that purpose and the dynamic properties necessary for working hard metal piezo workpieces precisely at the required cutting speeds.

While position-controlled working may be possible with known devices, this naturally can be done only with a sufficiently big distance from the first resonant frequency of the respective system, which means that working with the known systems is possible only up to approximately 1,000 Hz maximally. The cutting speeds so achievable are, however, insufficient for working the before-mentioned materials properly, with adequate surface quality, in particular when rotationally non-symmetrical surface structures of the before-mentioned kind are to be produced.

SUMMARY OF THE INVENTION

It is a first object of the present invention to provide a device and a method for producing microstructures which permits even hard metallic materials, such as hard alloys and cast iron, to be worked with high cutting speeds and which simultaneously allows rotationally non-symmetrical microstructures to be achieved.

It is a second object of the invention to provide a device and a method for producing microstructures on molds for the production, by hot-pressing, of lenses which are suited as lenses for PES spotlights and are provided with scattering lens microstructures.

It is a third object of the invention to provide a device and a method for producing microstructures by a turning operation with high cutting speed on workpieces consisting of a very hard or brittle material, such as hard metal or cast iron.

These and other objects of the invention are achieved with the aid of a device of the type described above in that the actuator is coupled with the tool via guide means that allows feeding of the tool in axial direction of the fast drive, against the action of a restoring force, and which is highly rigid in a plane perpendicular to that direction.

By coupling a fast drive with custom-designed guide means, having high rigidity in all directions in a plane perpendicular to the direction of movement of the fast drive, it is possible to provide an actuator-controlled system for movement of a turning tool that exhibits a sufficiently high resonant frequency in combination with high dynamic rigidity to allow even hard materials, such as hard alloys or cast iron, to be worked with sufficiently high cutting speeds. At the same time vibrations, which otherwise would occur when working hard materials, such as cast iron, and which would impair the surface quality, are avoided in this case.

Preferably, the fast drive is a piezo drive.

However, other embodiments of the fast drive, such as a hydraulic drive, are likewise imaginable. The term fast drive as used in connection with the present invention describes a drive which is capable of performing a fast controlled movement in the axial direction, but is not capable of performing a controlled movement in a plane perpendicular to that direction and can take up very small forces only in that latter direction. The term "fast" means in this connection that the drive, when driven by a specific control signal, can perform a movement at a frequency of at least 500 Hz or over.

According to a preferred further development of the invention, the guide means has a static rigidity of at least 50 N/μmm preferably of at least 100 N/μm, in a plane perpendicular to the feed direction of the guide means.

Such a device allows in particular the production of molds for hot-pressing of lenses for PES spotlights, the surfaces of which are provided with microstructures or are "frosted". Such a device permits cutting speeds in the order of 60 meters per minute to be achieved when working cast iron or hard alloys. This is sufficient to guarantee proper working of the rotationally non-symmetrical surfaces in an acceptable period of time. The inserts used in this case may be of a conventional type.

According to an advantageous further development of the invention, the guide means comprises a ram preferably supported on first and second spring elements, the spring elements being largely unyielding in the radial direction of the ram, while allowing deflection in the direction of the ram axis against the spring force of the spring elements.

According to an advantageous further development of that embodiment, the spring elements are configured for this purpose as leaf springs that have their lengthwise ends clamped in holders and can be moved transversely to that direction.

According to a convenient further development of that embodiment, the spring elements in that case consist of feeler gauge strips that are clamped in crossed arrangement between the holder and the ram in the radial direction.

Alternatively, a configuration as radially symmetrical spring elements, for example in the form of disk springs, is likewise possible, in which case the ram would be coupled at the center.

Such a structure allows sufficient resilience of the guide means in the direction of movement of the fast drive to be achieved, while simultaneously providing high rigidity in a plane perpendicular to that direction.

According to an advantageous further development of the invention, the tool is clamped at a first end of the ram while the ram is biased against the fast drive at its second end opposite the tool.

This guarantees the required restoring force against which the fast drive acts.

According to an advantageous further development of that embodiment, the ram is biased against the fast drive by fluid pressure.

Although biasing may generally be achieved also by mechanical means, such as by springs, this feature has the effect of reducing the effects of cutting-power noise.

According to an advantageous further development of that embodiment, the ram is held in a housing, the housing and the ram forming a pressure-tight space to which a fluid pressure can be applied, which space is sealed toward the outside in axial direction by a first diaphragm connected with the ram on the piezo side, and by a second diaphragm connected with the ram on the tool side, and the first diaphragm having a larger active surface exposed to the fluid pressure than the second diaphragm.

According to an advantageous further development of that embodiment, the diaphragms consist of aluminum.

It is possible in this way to guarantee the restoring force for the piezo drive in a simple and reliable fashion and, at the same time, to reduce the possible effects of cutting-power noise.

According to an advantageous further development of that embodiment, the housing comprises at least one damping element made from a sintered material, preferably a sintered metal. The damping element preferably exhibits in this case an amount of open porosity.

In addition in this design a gap having preferably a thickness between 0.1 and 1 millimeters and being filled with a damping medium may be formed between the damping element and the associated membrane. The damping medium may e.g. be air, grease or oil.

These features help to further reduce the effects of cutting-power noise.

According to an advantageous further development of the invention, the first end, i.e. the end opposite the ram, of the piezo drive is clamped on a holding fixture while its second end, opposite the first end, is coupled with the ram via a compensating element which is capable of compensating alignment errors between the ram axis and the longitudinal axis of the piezo drive.

In this case, the second end of the piezo drive may rest against an associated centering means of the ram via a convex element, for example, in particular a ball or a spherical element.

It is possible in this way to largely eliminate the application of static and dynamic transverse forces in radial direction, which might occur, for example, by alignment errors between the piezo drive and the ram and as a result of cutting-power noise.

According to an alternative embodiment of the invention, the second end of the piezo drive ends in a cover plate which is coupled with the ram via a necked portion.

In this way, the mass of the entire system can be still further reduced and, if necessary, one joint can be saved, which is of advantage in terms of the dynamics of the overall system.

According to a further development of the invention, the drive permits a feed motion in a direction perpendicular to the spindle axis, while the actuator permits a movement of the tool in the direction of the spindle axis.

With this embodiment, the turning operation is effected in the way of a facing operation, as the tool is being fed by the piezo drive substantially in the direction of the spindle axis, i.e. in z direction.

Such a structure is suited, for example, for producing microstructures on molds for the production of lenses for PES spotlights.

According to a further embodiment of the invention, the drive performs a feed motion in a direction parallel to the spindle axis, while the actuator permits the tool to be moved in a direction perpendicular in that direction.

In the case of that arrangement, surface working of the workpiece, by producing microstructures on its outer surface, is possible in longitudinal direction. Accordingly, the arrangement works in the way of a longitudinal turning machine, with the actuator allowing the tool to be fed in a plane perpendicular to the spindle axis, i.e. for example in x direction.

Such an arrangement is suited, for example, for the production of microstructures on surfaces subjected to tribological stresses, such as outer bearing surfaces, for example for the purpose of improving adhesion of grease, to thereby achieve clearly improved lubrication properties and anti-seizure performance.

According to a convenient further development of the invention, there is provided an electronic control for controlling the movement of the actuator, which controls the movement of the actuator relative to the workpiece in response to the angular position of the workpiece and the position of the actuator along the first direction.

This allows rotationally non-symmetrical surface structures to be achieved with the aid of the piezo feed motion of the tool.

According to a further configuration of the invention, the control comprises means for transforming a specified microstructure to be produced in the mold, defined by Cartesian coordinates, to a coordinate-transformed structure defined by polar coordinates, where the actuation values are stored as a function of polar coordinates containing the angle of rotation and the radius.

Such coordinate transformation allows the respective actuation values for the actuator to be determined in the case of facing operations.

The coordinate-transformed structure is stored in this case preferably in a look-up table (LUT), from which the electronic control derives an actuation value that is supplied to an amplifier for the purpose of controlling the actuator.

According to a preferred further development of that embodiment, the electronic control comprises means for interpolation of the actuation signal supplied to the amplifier as a function of position increments of the linear feed motion in the first direction.

While interpolation is rendered superfluous by the inertia of the mechanical system in the working direction of the piezo drive, which automatically has a certain smoothing effect, interpolation of the actuation signals supplied to the amplifier as a function of position increments of the linear feed motion makes sense. One thereby avoids the formation of marks similar to tool marks produced by the linear feed motion in radial direction as adjacent pixels of the microstructure are being mapped.

According to a further advantageous embodiment of the invention, the actuator has a first resonant frequency of at least 1,500 Hz, preferably of at least 2,000 Hz, more preferably of at least 3,000 Hz, the control means being designed to supply the actuator with a low-pass filtered or band-pass filtered signal whose upper cut-off frequency is below the resonant frequency of the actuator.

This embodiment makes it possible, without position control of the actuator, to work with a high cutting speed which is selected to ensure that the cut-off frequency of the desired microstructure to be produced is slightly below the resonant frequency of the actuator. It is thus possible for an open-loop system without position control to work with the highest possible cutting speed that is still sufficiently spaced from the resonant frequency of the actuator.

The object of the invention is further achieved by an actuator adapted to move the tool of a turning machine for producing a microstructured surface using a piezo drive, the piezo drive being coupled with the tool via guide means that allow the tool to be fed in the axial direction of the piezo drive, against the action of a restoring force, and that exhibits high rigidity in a plane perpendicular to that direction.

With respect to the method, the object of the invention is achieved by a method for producing a microstructured surface on a workpiece rotated by a spindle, using an actuator-driven tool that can be moved in the direction toward the workpiece surface by an actuator and can be linearly positioned, in a direction perpendicular thereto, along the workpiece surface by a further drive, the method comprising the following steps:

(a) Providing a desired microstructure for a workpiece to be worked;

(b) transforming the desired microstructure to a file (look-up table, LUT) containing actuating positions in a perpendicular working direction as a function of the angle of rotation of the workpiece and the linear feed travel of the tool along the workpiece surface, for the piezo-controlled feed motion of the tool;

(c) performing a spatial frequency analysis of the desired microstructure, and determining a maximum cut-off frequency of the signal for the feed position as a function of the angle of rotation, the linear feed motion of the actuator along the workpiece surface and of the cutting speed;

(d) setting the cutting speed for the turning operation of the workpiece so that the maximum cut-off frequency of the desired microstructure is lower than the first resonant frequency of the actuator;

(e) driving the spindle and a drive for linear positioning of the actuator along the workpiece surface and producing microstructures on the workpiece by feeding the tool against the workpiece surface by means of the actuator based on actuation values derived from the look-up table as a function of the cutting speed, the angle of rotation and the length of the feed motion of the actuator along the workpiece surface.

The method according to the invention thus ensures that in microstructuring the workpiece, the highest possible cutting speed can be used while still operating the actuator at a frequency below its resonant frequency. This allows the system to be utilized up to its maximum cutting speed defined by the resonant frequency of the actuator, without a position control being necessary.

The method according to the invention basically is also suited for use in combination with conventional devices for microstructuring workpieces by a turning operation using actuator-controlled tools. Preferably, however, the method according to the invention is used in combination with a device according to the invention.

According to an advantageous further development of the method according to the invention, the signal for the feed motion of the actuator is low-pass filtered or band-pass filtered, if the cutting speed that can be adjusted according to step (d) is insufficient.

In the event spatial frequency analysis of the desired microstructure to be produced shows that very high frequencies of the kind occurring, for example, in the case of sharp edge transitions, are contained, the cutting speed to be selected normally would be clearly reduced to maintain sufficient spacing from the resonant frequency of the system. The feature described above ensures in this case that a high cutting speed can be used even in the case of such a desired microstructure. By initially filtering the signal, the desired microstructure is sort of smoothed to ensure that a sufficiently high cutting speed can be used for working, for example, hard materials such as cast iron or hard alloys.

According to a further embodiment of the invention, the desired microstructure of the workpiece is produced with the aid of an algorithm in such a way that low-pass limited white noise occurs in the spatial frequency analysis.

The desired microstructure of the workpiece can be produced in this case by a dot pattern generated by a random-check generator, folded by a deep-pass filter, preferably a binomial filter.

With this configuration of the microstructure, it is possible to ensure already during production of the desired microstructure that a low-pass filtered signal is obtained which is in particular well suited for working slightly below the resonant frequency of the actuator.

Alternatively, such a desired microstructure can be produced by generating a randomly generated dot pattern which is then transformed to a frequency space, is low-pass filtered and retransformed to the local space.

Such a desired microstructure is in particular well suited for the production of a mold for fabricating a lens for a PES spotlight by hot-pressing, where a scattering lens microstructure is to be formed on the lens surface.

According to the method of the invention, the actuator advantageously can be fed in the direction of the spindle axis and can be positioned by the first drive in a direction perpendicular to that direction.

This permits working in the way of a facing operation.

Alternatively, the actuator can be positioned by the first drive in the z direction, parallel to the spindle axis, and can be fed against the workpiece surface in a direction perpendicular to that direction.

In the case of that embodiment, microstructuring of the workpiece is rendered possible in the way of a longitudinal turning operation.

As has been mentioned before, the method according to the invention is in particular well suited for microstructuring an optical element, in particular a lens microstructure or a scattering structure, or for the production of hot-pressing mold for such an optical element.

In addition, the method according to the invention is suited for numerous other purposes in which microstructures are to be produced on workpiece surfaces. This includes, among other things, the production of microstructures on a surface subjected to tribological stresses, in particular for a friction bearing.

It is understood that the features of the invention mentioned above and those yet to be explained below can be used not only in the respective combinations indicated, but also in other combinations or in isolation, without leaving the scope of the present invention.

BRIEF DESCRIPTION OF THE DRAWINGS

Further features and advantages of the invention will be apparent from the description that follows of certain preferred embodiments, with reference to the drawing in which:

FIG. 7 shows a spatial frequency analysis of the desired microstructure according to FIG. 6, along the outer periphery at a radius of R=34 mm;

DESCRIPTION OF PREFERRED EMBODIMENTS

Figure 1:
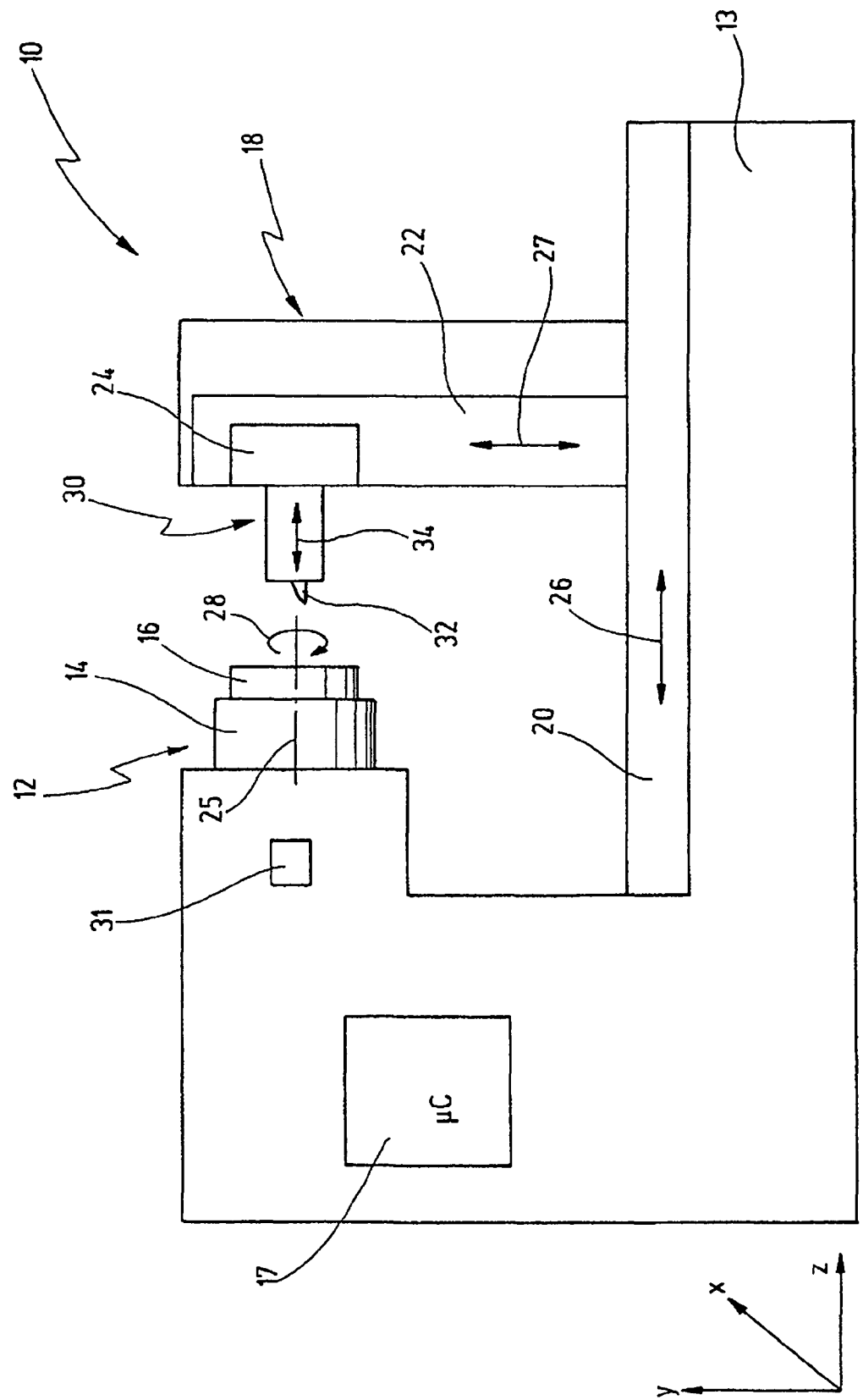
FIG. 1 shows a greatly simplified diagrammatic representation of a device according to the invention.

In FIG. 1, a device according to the invention is shown very diagrammatically and is indicated generally by reference numeral 10.

The device 10 according to the invention is a turning machine which is additionally equipped with an actuator 30 in order to permit fast, piezo controlled movement of a tool 32 relative to a workpiece 16. The device 10 comprises a spindle 12 that can be driven for rotation about its spindle axis 25, as indicated by arrow 28. Mounted on the spindle 12 is a fixture 14 in the form of a chuck adapted to clamp a workpiece 16.

A drive 20 is provided on a machine bed 13 of the device 10, along a guide extending in the z direction (parallel to the spindle axis 25), by means of which a tool carriage 18 can be displaced in z direction, as indicated by double arrow 26. The tool carriage 18 is provided with a drive 22 by means of which a carriage 24 can be displaced in vertical direction (y direction) as indicated by double arrow 27. The carriage 24 in turn is provided with a further drive allowing it to be moved in horizontal direction (x direction, perpendicular to the spindle axis 25).

The carriage 24 finally supports the actuator 30 by means of which the tool 32 can be additionally displaced in z direction, as indicated by double arrow 34.

For controlling the turning machine and the actuator, there is provided a central control, indicated diagrammatically by reference numeral 17. The angular position of the spindle 12 can be monitored by an encoder 31.

Now, for producing a microstructure on the surface of a workpiece 16, the device 10 can be used in such a way that the workpiece 16 is rotated by the spindle 12 about the spindle axis 25 while the actuator 30 is positioned in the x direction by the carriage 24, and the tool 32 is fed in x direction toward the workpiece surface by the actuator 30 in response to the angular position of the workpiece 16, determined by the encoder 31, and the spatial coordinate of the actuator 30. In this way, microstructures can be produced on the workpiece surface, and rotationally non-symmetrical surface structures can be produced with high precision.

The structure described with reference to FIG. 1 allows workpieces to be worked in the way of a facing operation, which means that the workpiece is set into rotation and the tool 32 is moved predominantly in horizontal direction (x direction), transversely to the spindle axis, or in radial direction to the workpiece 16, while the fast feed motion of the actuator 30 occurs in z direction, i.e. in the direction of the spindle axis 25. Other movements in other directions, for example in z direction for the purpose of turning contours, are of course additionally possible.

It is understood that working the workpiece in the way of a longitudinal turning operation is likewise possible. In this case, the positioning movement of the actuator 30 is effected by the drive 20 in z direction while a feed motion is rendered possible by the actuator 30 in a plane perpendicular to that direction (x/y plane). Conveniently, the actuator is positioned for this purpose on the carriage 24 in such a way that the piezo axis extends in x direction (or else in y direction). Such an arrangement is suited, for example, for producing a microstructure on the outer surface of a workpiece (or on its inner surface) in the way of an external cylindrical turning operation or an internal cylindrical turning operation.

The particular structure of the actuator, which can be moved very fastly in the direction of the piezo axis, against the action of a restoring force, but which exhibits high rigidity in a plane perpendicular to the piezo axis, will be described hereafter in more detail with reference to FIGS. 2 and 3.

Figure 2:
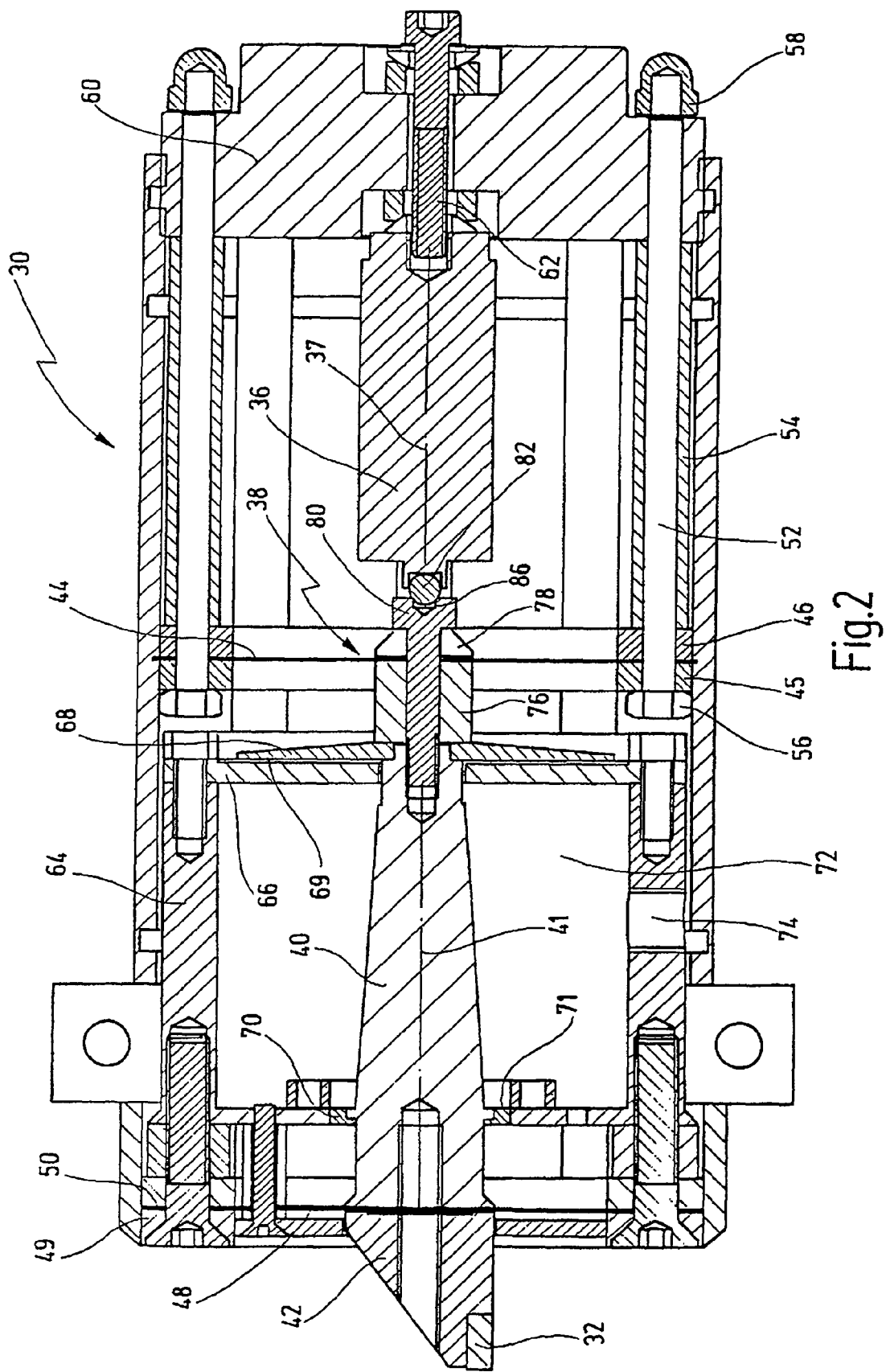
FIG. 2 shows a longitudinal section through an actuator according to the invention as shown in FIG. 1.
Figure 3:
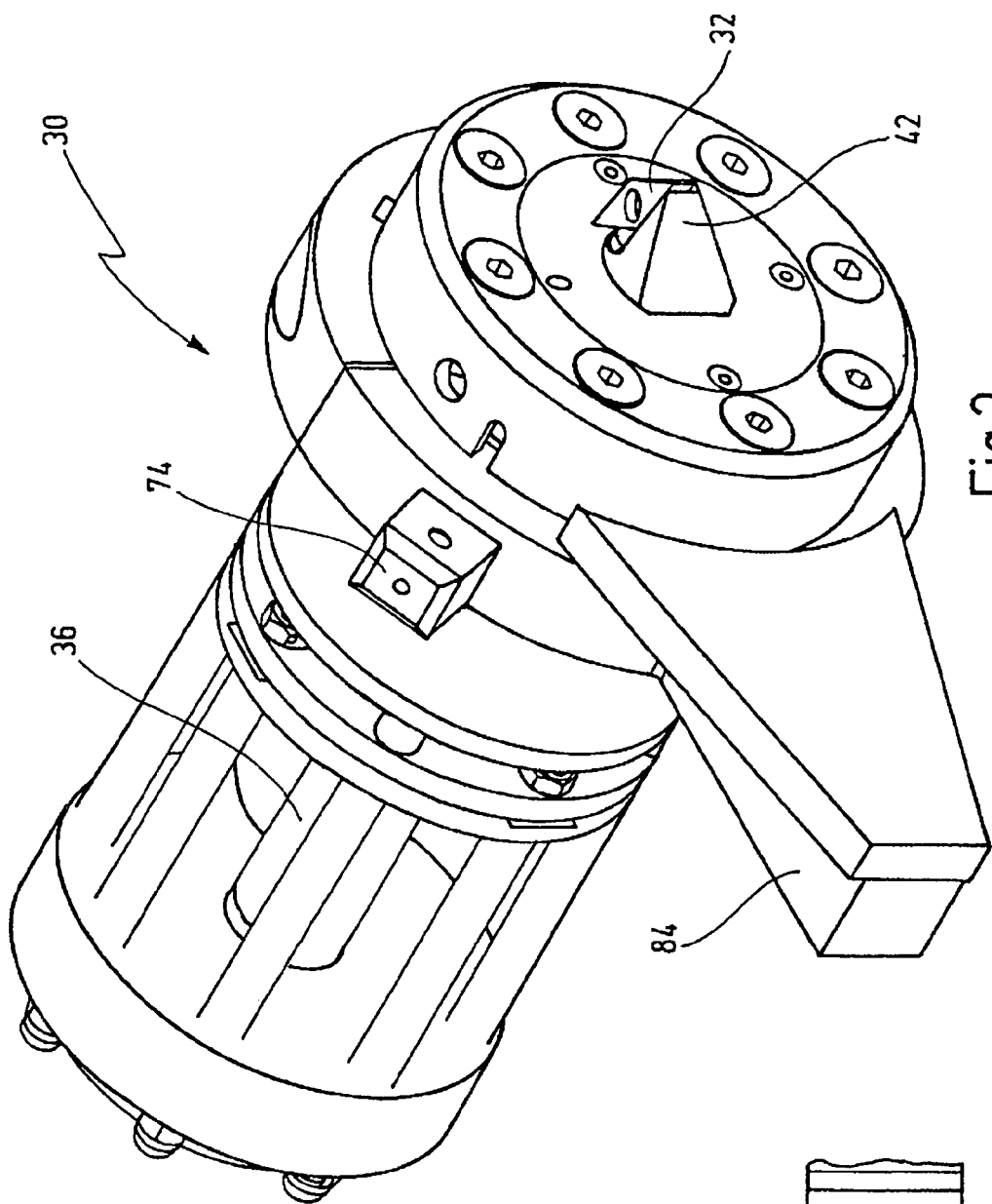
FIG. 3 shows a perspective view of the actuator according to FIG. 2.

The actuator illustrated in FIGS. 2 and 3 and indicated generally by reference numeral 30 consists essentially of a piezo drive 36, received on a housing and acting on a tool 32 via guide means 38. The piezo drive 36 allows movement only in the axial direction of the piezo drive, and is incapable of producing feed power in a plane perpendicular to that direction. Now, it is guaranteed by the guide means 38 that feed movements of the piezo drive 36 in its axial direction can be transmitted directly to the tool 32, while the entire actuator 30 exhibits high rigidity in a plane perpendicular to the piezo axis.

The guide means 28 comprises for this purpose a ram 40 whose ram axis 41 is aligned as exactly as possible to the longitudinal axis 37 of the piezo drive 36. The ram 40 can be moved along its ram axis 41 in axial direction, against the force of first spring elements 44 and second spring elements 48, but is suspended in practically unyielding fashion in a plane perpendicular to the ram axis 41, due to the special design and clamping arrangement of the spring elements 44, 48. The spring elements 44 and 48 are leaf springs made from spring steel of great width and small thickness, as known for example from the use as feeler gauge strips. The outer ends of the leaf springs are clamped in holders while the ram 40 is mounted in the middle of them. The first spring elements 44 are clamped between annular holders 45, 46, while the second spring elements 48 are clamped between annular holders 49, 50.

All in all, one obtains in this way a possible axial excursion of the ram in the order of approximately 0.5 mm, whereas the ram 40 is held very rigidly in a plane perpendicular to that direction (static rigidity above 100 N/μm). The necessary restoring force acting on the piezo drive 36 is produced pneumatically, not mechanically, in this case. The ram 40 is suspended for this purpose in a housing 64 in such a way that a cavity 72 is achieved, which is sealed air-tight toward the outside and which can be supplied with compressed air via a compressed-air connection 74. The cavity 72 is sealed in the axial direction, at its end facing the piezo drive 36, by a first diaphragm 68 and at its end facing the tool by a second diaphragm 70. The diameter effective to the outside (to ambient air) of the first diaphragm 68, that faces the piezo drive 36, is clearly greater in this case than the diaphragm diameter 70 on the opposite side. This results in a differential pressure which biases the ram 40, which is connected by the two diaphragms 68, 70 at the center, in the direction of the piezo drive 36. The biasing force, which of course should be greater than the acceleration forces produced by the piezo drive 36, can be adjusted by proper selection of the surface area relationships of the diaphragms 68, 70 and by the pressure applied.

The diaphragms 68, 70 preferably consist of relatively rigid aluminum elements and are each in contact, by their outer peripheries, with a thin counter-diaphragm 69 or 71, respectively, which are pressed against the diaphragm 68 or 70, respectively, due to the overpressure prevailing in the cavity 72. Further, a sintered metal plate 66, which largely extends over the entire cross-section of the cavity 72, is retained at a very small distance from the counter-diaphragm 69 on the axial end of the cavity 72 facing the piezo drive. The sintered metal plate 66 consists, for example, of sintered steel and exhibits a certain amount of open porosity.

The sintered metal plate 36 is, therefore, permeable to air so that the pressure prevailing inside the cavity 72 can be transmitted to the diaphragm 68, whereas the thin channels formed by the open porosity lead to a notable damping effect whereby the effects of cutting-power noise in operation of the actuator are clearly reduced.

The tool 32 as such may be configured, for example, as insert mounted on a fixture 42, which latter is mounted on the outer axial end of the ram 40 (by means of a screw not shown), the mounting on the second spring elements 48 being simultaneously realized by the crossed spring strips. The opposite end of the ram 40 is firmly connected with the two first crossed spring elements 44. This is effected by a screw 80 which extends through corresponding central recesses in the two crossed spring elements 44 and an intermediate spacer 76 as well as an intermediate piece 78, and into the end of the ram 40 with which it is connected by screwing.

The piezo drive 36 has its end, that faces away from the ram 40, rigidly joined by a screw connection with an end piece 60, via a piezo seat. At its end facing the ram 40, the piezo drive 36 is in contact with the screw 80 via a ball 82 and a centering element 86. One avoids in this way any radial forces acting on the piezo drive 36, that may result from alignment errors between the longitudinal axis 37 of the piezo drive 36 and the ram axis 41. It is thus ensured that the piezo drive 36 will be loaded in the direction of its longitudinal axis 37 only.

The unit formed by the piezo drive 36 and its suspension and the end piece 60 is screwed together directly through the holders 45, 46 via threaded bolts 52 and intermediate spacer sleeves 54.

The entire arrangement thus provides a compact actuator 30 where the piezo drive 36 can be moved in axial direction against a pneumatic restoring force and exhibits high rigidity in a plane perpendicular to that direction.

Additional features, such as complete splash protection suited to protect the piezo drive 36 from cutting oil during the turning operation, need not be described here in detail, being commonly known to any man of the art.

Figure 2A:
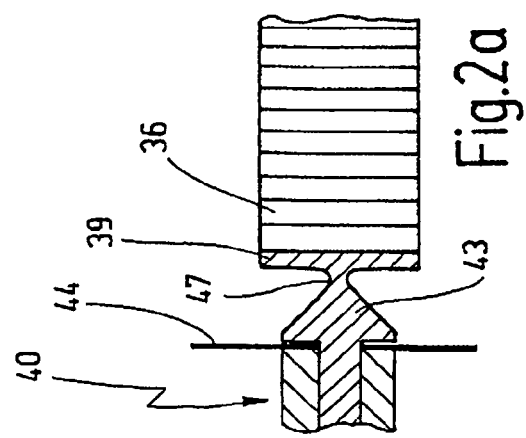
FIG. 2a shows a detail of the actuator according to the invention, slightly modified compared with FIG. 2, illustrating the area of the connection between actuator and ram.

A modification of the connection between the piezo drive 36 and the ram 40 can be seen in FIG. 2a. Here again, a compensation element 43 is provided between the piezo drive 36 and the ram 40, for compensating potential alignment errors between the longitudinal axis 37 of the piezo drive 36 and the ram axis 41. However, the compensation element 36 is configured in this case as necked portion 47 coupled directly with an end plate 39 of the piezo drive 36 and with the ram 40, thereby realizing a direct, but laterally flexible connection between the piezo drive 36 and the ram 40.

There can be additionally seen in FIG. 3 a lateral bracket 84 by means of which the actuator 30 can be mounted on the carriage 24, for example.

Figure 4:
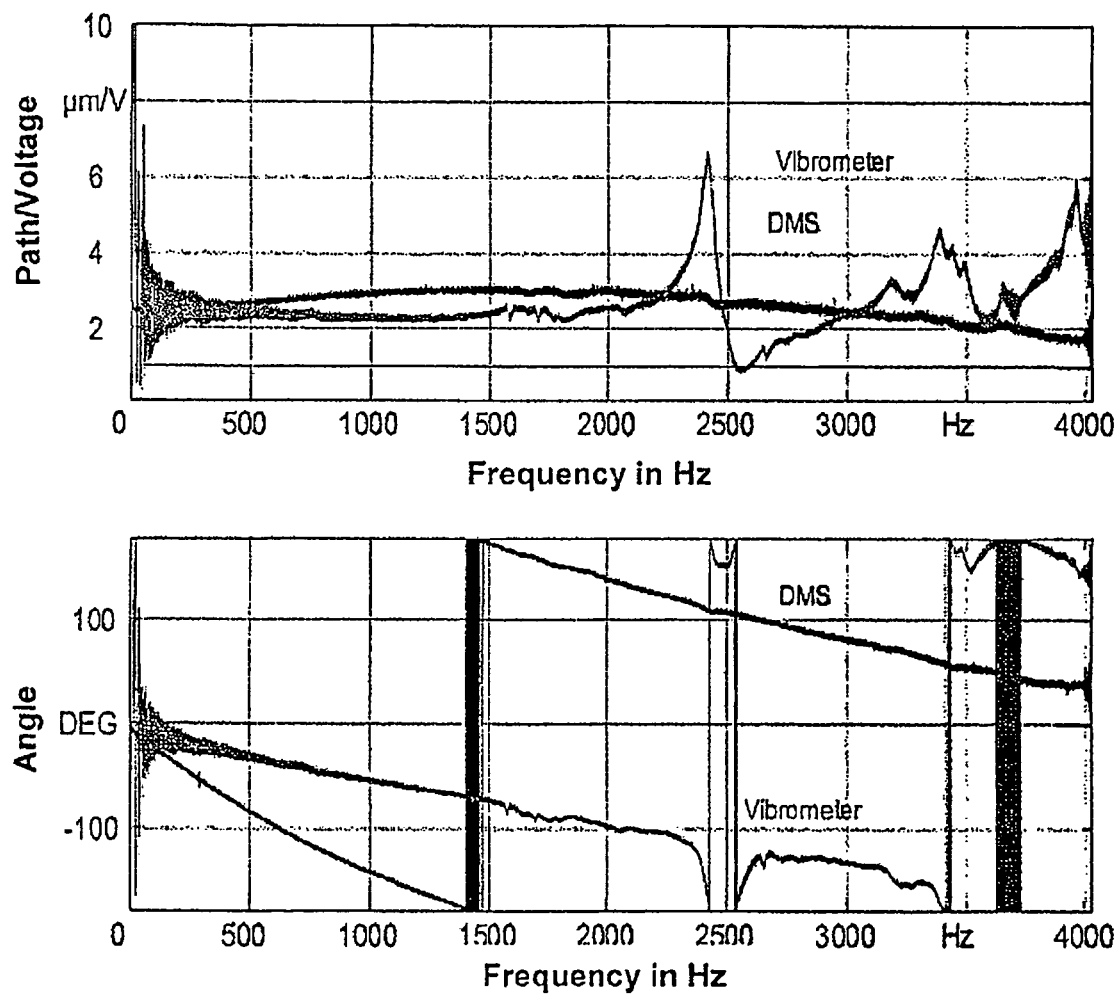
FIG. 4 shows the frequency response characteristic and the phase response characteristic of the actuator with tool, according to FIG. 2.

FIG. 4 now shows the measured frequency response characteristic and the working range of the actuator according to FIGS. 2 and 3. In the present case, a piezo crystal with a maximum feed of 40 µm was used as piezo drive 36. The piezo drive 36 was excited with an amplitude of 1 V in a frequency range from 0 to 4,000 Hz. The upper diagram in FIG. 4 shows the travel as a function of the excitation voltage. The vibrometer travel recorded directly on the tool 32 shows a very constant amplitude characteristic of approximately 2.5 µm/V of 0 to approximately 2250 Hz. The first resonant frequency is approximately 2,400 Hz.

The lower portion of the diagram of FIG. 4 shows a representation of the phase response characteristic as a function of the frequency. The phase response characteristic is very linear, from 0 to 2250 Hz.

Due to its very good dynamic properties, the actuator according to the invention is, thus, in particular well suited for producing microstructures on surfaces, in particular for machining operations on hard materials, for which high cutting speeds are required. In the case of a structure amplitude of 5 µm, for example, feed frequencies of up to 2.25 kHz can be realized. For higher feed amplitudes, or very great material removal rates, the maximum feed frequency would by somewhat lower. A further improvement of the dynamics by the use of a conventional closed-loop control (instead of the open-loop control used here) does not seem to be necessary, and would not be possible up to slightly below the resonant frequency, due to the measured phase response characteristic.

The maximum actuator travel of the actuator 30 used is approximately 40 µm, so that the resonant frequency is in the range of approximately 2,400 Hz. In many applications, however, a piezo drive with a maximum actuator travel of 20 µm would be sufficient. This would then result in an increase of the lowest resonant frequency to approximately 3.5 kHz.

The selection of the correct working conditions for the production of a lens microstructure will now be described in more detail with reference to FIGS. 5 to 7.

The actuator 30, which has been described in detail above with reference to FIGS. 2 to 4, was used in connection with a turning machine of the type Index built in 1978, which comprised a highly precise spindle with a radial eccentricity in the order of 0.4 µm.

The device was used for the production of a mold for hot-pressing of lenses for PES spotlights. In order to comply with given light intensity distribution characteristics, selected surface areas of the respective lens must be provided in this case with a microstructure in the form of micro lenses. Such a microstructured or "frosted" lens leads to special light intensity distribution characteristics when used in the respective poly ellipsoid spotlight. The microstructure of the surface defined in the mold is transferred to the lens surface during production of the lens by hot-pressing.

Figure 5:
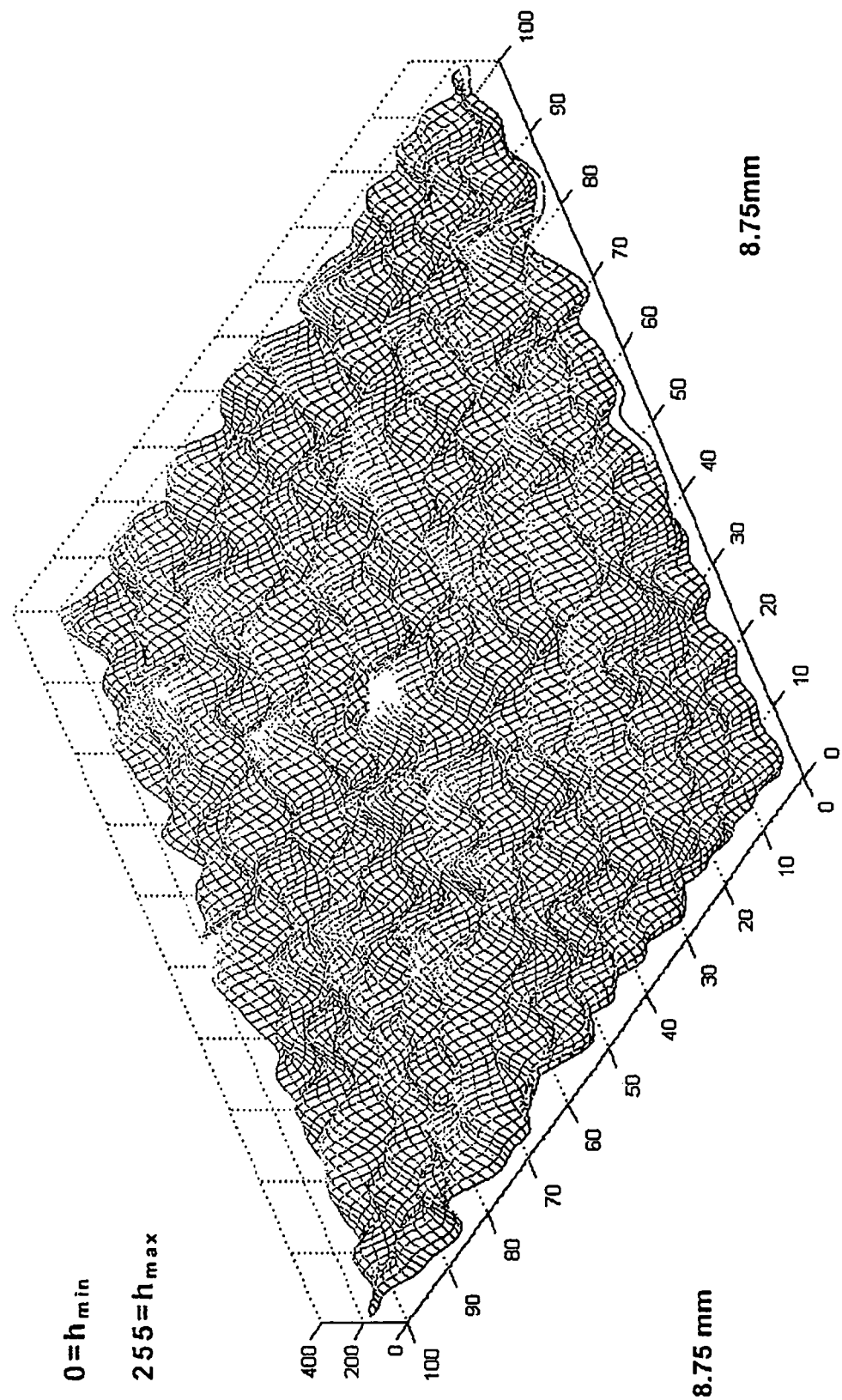
FIG. 5 shows an enlarged detail of a desired lens microstructure to be produced for fabrication of the mold for the production of a lens for a PES spotlight.

FIG. 5 now shows an enlarged detail of such a microstructure. The grey value plotted on the vertical axis is $h_{min}=0$ and $h_{max}=255$, which corresponds to a peak-to-valley depth of 0 to approximately 10 µm.

Such a structure can be produced also by a randomly generated dot pattern, folded by a binomial filter. For producing such a structure, as illustrated in FIG. 6, individual pixels may be addressed by a random-check generator, for example in an image 801 b 801 pixels big. If no pixel has been addressed before in a spatial distance of n pixels (i.e. all grey values of neighboring pixels in that circumscribed circle are 0), then the grey value at the addressed pixel is set to 1. The random-check generator performs several hundred thousand cycles in this way. The result is an image with randomly ordered pixels of the grey value 1, where every pair of neighboring pixels does not fall below that limit. The image is then folded two-dimensionally by the binomial filter, if necessary a plurality of times. Speaking figuratively, the binomial filter is "put on" each of the individual pixels of grey value 1 at the center. The result is an image with the randomly arranged "peaks" and "valleys" which very efficiently simulates the shape of a lens microstructure according to FIG. 5. As a binomial filter of that kind has low-pass properties, the entire image has low-pass properties as well. This fits in very well with fabrication using the actuator employed.

Figure 6:
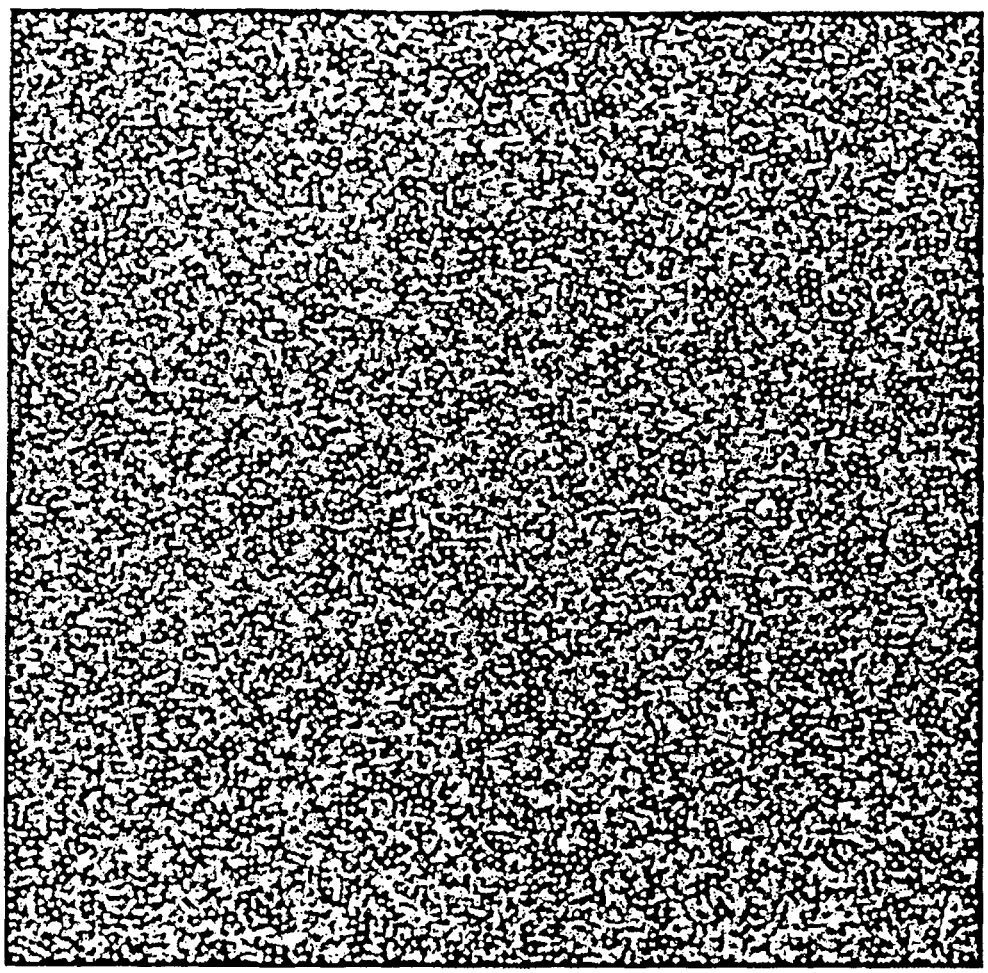
FIG. 6 shows a representation of the desired microstructure according to FIG. 5 as a pixel map.

In the illustrated case the microstructure illustrated in FIG. 5 or FIG. 6, respectively, is to be applied on the surface of the mold by a facing operating using the actuator 30. It is of course necessary in this case to convert the desired microstructure, defined by Cartesian coordinates, to a polar system of coordinates. This structure, converted to polar coordinates, may be stored in the form of a look-up table (LUT), for example. This table then defines the output value G(c,n) for the actuator as a function of the angle of rotation (c) and of the position (n) of the actuator in radial direction.

FIG. 7 now shows a spatial frequency analysis derived from a structure according to FIG. 6. The spatial frequency is recorded in this case on the outer circumference of the structure to be investigated (in the present case at a radius of 34 mm) by FFT Fourier analysis (fast Fourier transform). From the illustrated surface spectrum over a circumferential section it appears that the spatial frequency response characteristic is relatively constant from zero to approximately two periods per millimeter. Starting at approximately 2.8 structures per millimeter, the spatial frequency response characteristic is near zero.

The lower representation in FIG. 7 illustrates the conversion of the spatial frequency characteristic recorded by means of FFT analysis to an oscillation frequency characteristic, based on an assumed tool cutting speed of 50 m/min. The result is a linear drop of the spatial frequency characteristic to near zero after 2,350 Hz, while a very linear phase characteristic exists up to approximately 1.7 kHz.

According to the invention, the cutting speed is selected to ensure that the amplitude response characteristic will have dropped to zero at the first resonant frequency of the actuator, which in FIG. 4 is shown as being approximately 2,400 Hz. The selected structure therefore allows the cutting speed to be set to 50 meters per minute since the spatial frequency characteristic of the actuator has dropped to approximately 2,350 kHz which is near zero. The desired surface generated by means of the random-check generator, as shown in FIG. 6, which corresponds to the spatial structure shown in FIG. 5, therefore has the amplitude response characteristic of white noise, limited by low-pass filtering, and can advantageously be produced with the aid of the actuator 30 according to the invention with a cutting speed of approximately 50 m/min. This allows working of even very hard metal materials, such as hard alloys, that require sufficiently high cutting speed, as otherwise vibration would occur.

Figure 8:
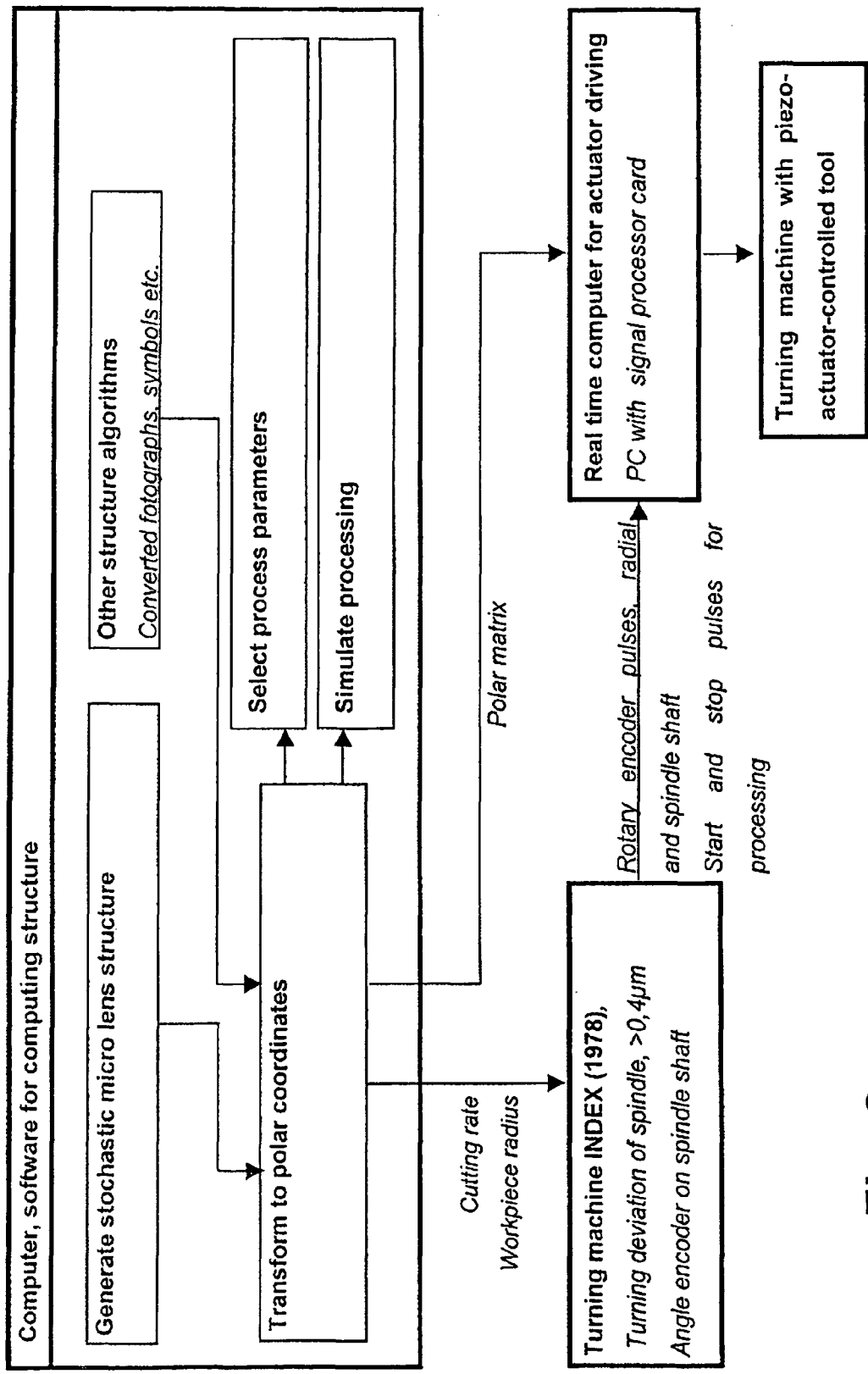
FIG. 8 shows a block diagram including the control for the actuator.

FIG. 8 illustrates the general control of the device 10 used for forming a microstructure, when working in the way of a facing operation.

As a first step, a stochastic lens microstructure is produced (compare FIGS. 5 and 6, respectively). Alternatively, it is of course also possible to image other structures, such as converted photos, symbols, etc.

These structures are then transformed to polar coordinates.

Then follow the selection of the working conditions and the simulation of the working conditions, based on a spatial frequency analysis. Using a suitable cutting speed, a real-time computer used for driving the actuator, which may consist of a PC with signal processor card, then generates the necessary actuation signals for the actuator and for positioning the actuator in radial direction. The real-time computer evaluates for this purpose the pulses generated by the encoder 31 for the axis of rotation and the pulses generated by a further encoder for the radial axis, and generates the initiating and the terminating pulses for the working operation.

The spatial frequency analysis determines the cut-off frequency of the desired microstructure to be produced. If the spatial frequency analysis indicates a very high cut-off frequency, this has the result that a very low cutting speed can be selected only to ensure that the maximum cut-off frequency will remain below the first resonant frequency of the actuator. This may be the case, for example, if the desired microstructure to be produced comprises sharp edges or the like.

It would then be convenient to first smooth the desired microstructure by application of a low-pass filter or a band-pass filter, for example a Sobel filter, in order to obtain a low-pass filtered signal that can be worked with advantage using the actuator system according to the invention.

The desired microstructure to be produced (compare FIG. 6) should have a square shape, with an odd number of imaged pixels of, for example, 801 by 801 pixels. Based on that square structure, it is then possible during the facing operation to work a circle of 801 pixels in diameter. In order to obtain square pixels also at the outer contour of the mage, the image format should correspond approximately to the resolution of the encoder for the spindle axis, divided by PI (pixel accuracy). If the depth is selected to be 1 Byte (=255 grey levels), the encoder used may have 2,500 increments, for example. By way of example, the 255 grey levels should later correspond to a depth of 0 to 10 μm for the depth feed motion of the actuator.

Figure 9:
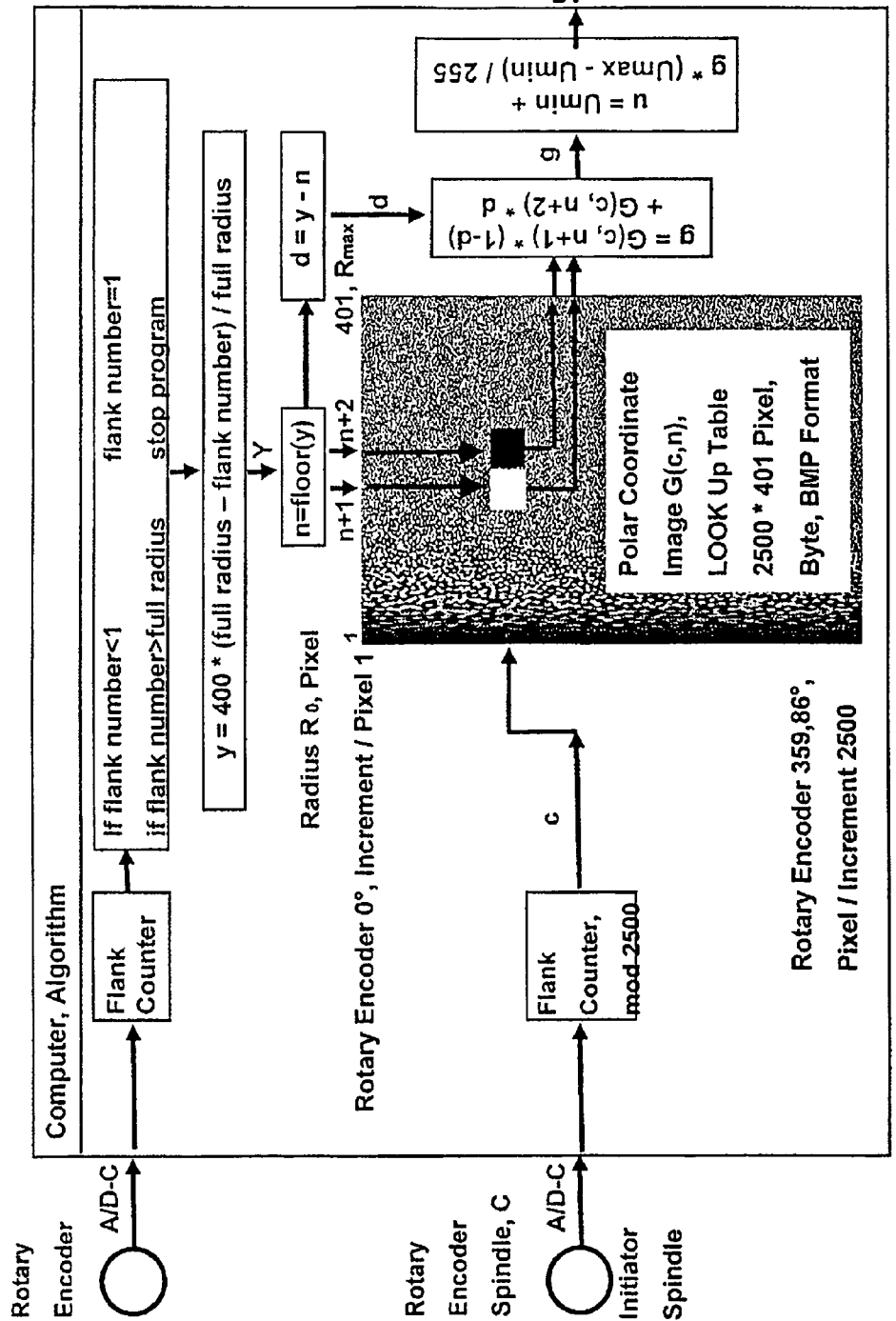
FIG. 9 shows a diagrammatic representation of the algorithm for driving the acuator.

FIG. 9 now shows the relevant algorithm for such a working operation.

The desired microstructure to be produced is converted to polar coordinates and is stored as a polar-coordinate image G(c, n) in a LUT with 2,500×401 pixels, the actuation value of the actuator being given with an accuracy of 1 Byte. The actuation value G may thus assume values of between 0 and 255, which may correspond to an actuator excursion of between 0 and maximally 40 μm, or else to a smaller range of, for example, 0 to 10 μm.

The polar-coordinate image illustrated in FIG. 9 is stored in the LUT in the BMP format.

As illustrated in FIG. 9, the angular position of the spindle 12 is picked up by means of the spindle C encoder and is recorded via the edge counter, and processed as a "c value", based on an initial "spindle initiation" value, after conversion to a digital value.

Likewise, the radial position of the actuator is picked up by an encoder Y, and is processed via an edge counter after conversion to a digital value.

The piezo drive is controlled via a real-time computer using the actuation values for the z direction (travel of $h_{min}$ to $h_{max}$). The amplifier receives its input values from the LUT and from the values received from the encoder for the angular position and the radial position, via a digital-to-analog converter, according to a suitable algorithm.

The amplifier input voltage $U_{min}$ at g=0 corresponds to $h_{min}$, while the amplifier input voltage $U_{max}$ at g=255 corresponds to the maximum actuation value $h_{max}$. The term "com-plete radius" describes the number of radial pulses for the travel from $R_{max}$ to $R_0$ (i.e. from the outer radius to the center). The term "floor(y)" in FIG. 9 indicates that the number has been rounded to the next lower even number.

Using the algorithm illustrated in FIG. 9, the amplifier is controlled via the digital-to-analog converter, based on the values from the LUT and the encoder C values for the spindle and the radial encoder Y for the radial position.

The algorithm makes use of interpolation for two immediate adjacent pixels in the radial direction to smooth the amplifier input voltage by one pixel in radial direction for the feed motion of the actuator. As is shown in the first box at the right beside the polar-coordinate image, the algorithm interpolates g=G(c, n+1)*(1−d)+G(c, n+2)*d. From this, the digital value u for the amplifier input voltage is obtained as $u=U_{min}+g*(U_{max}-U_{min})/255$. This value is converted by the digital-to-analog converter to an analog value for controlling the amplifier.

Thus, linear interpolation of the actuating values is carried out for adjacent pixels in the axial direction, while no interpolation is performed for the angle of rotation. One thereby avoids "turning marks" showing in the turning direction, which otherwise would be noticeable.

No interpolation is required for the actuation value at constant radial position, the mechanical system of the actuator having sufficiently high inertia to provide a smoothing effect in the circumferential direction.

Figure 10:
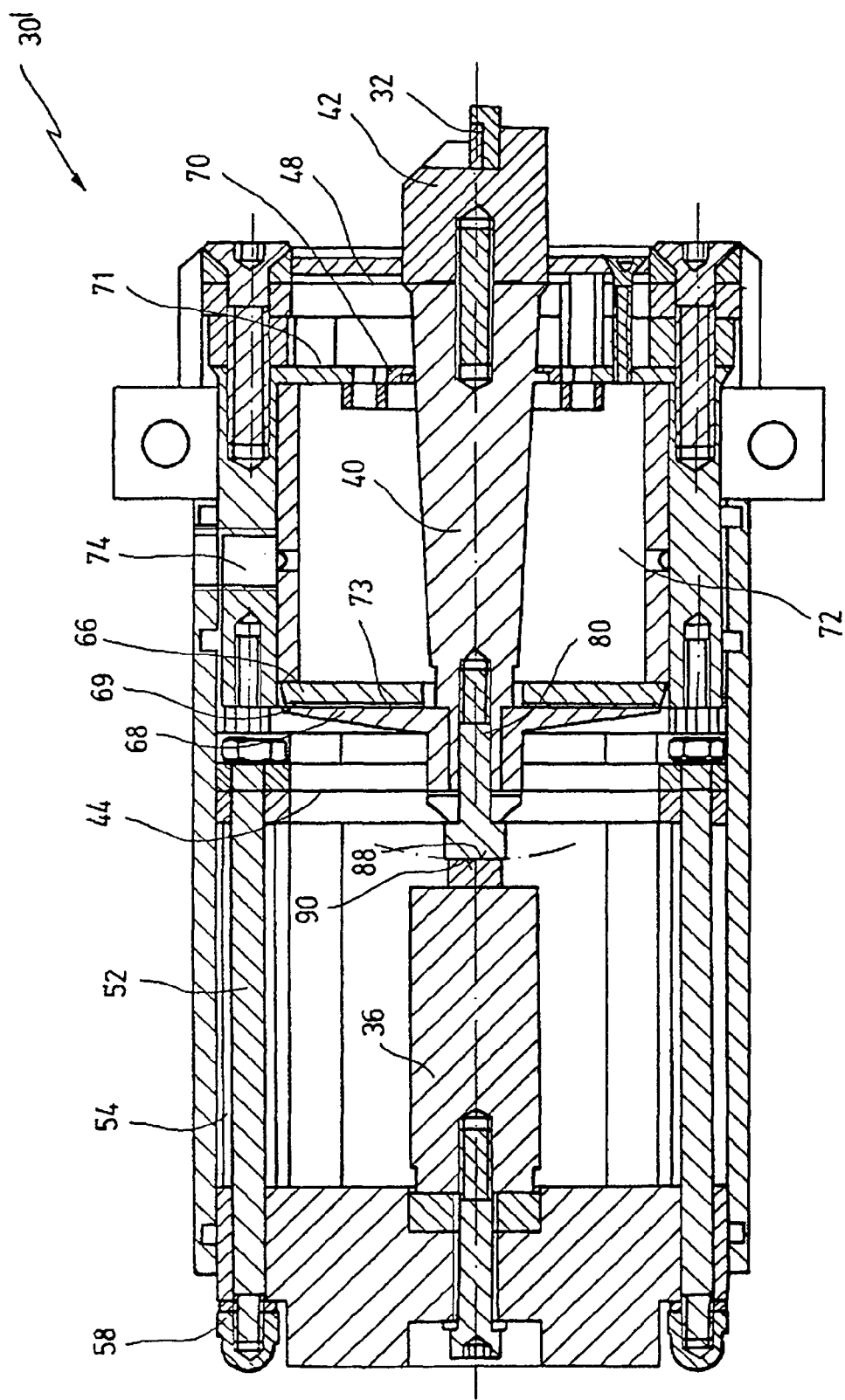
FIG. 10 shows a longitudinal section through an actuator according to the invention which is slightly modified with respect to the embodiment shown in FIG. 2.

In FIG. 10 a longitudinal section through an actuator according to the invention is shown which is slightly modified with respect to the embodiment shown in FIG. 2 and which is designated with numeral 30' in total. Herein corresponding parts are designated with corresponding reference numerals.

The actuator 30' largely corresponds in its design to the actuator previously described with respect to FIG. 2. By contrast to the embodiment of FIG. 2 now the tool holder 42 is positioned so that the tool is precisely center-aligned. Thereby force components perpendicular to the axial direction, which would result in an off-axis configuration, can be avoided. Thus the cutting-power noise is further reduced.

In addition, the centering between the ram 30' and the piezo drive 36 is designed with a crowned surface 88 at the screw 80 and with a flat counter surface 90 at the piezo drive 36.

Finally, in addition between the sintered plate 66 and the membrane 68 or the counter membrane 69, respectively, a small gap 73 of a thickness of about 0.1 to 1 millimeters, preferably of 0.1 to 0.5 millimeters, is formed which is filled with a damping medium. This can for instance be air, grease or oil.

Also thereby the cutting-power noise is further reduced.

What is claimed is:

1. A device for producing microstructures, comprising:
a spindle which can be rotated about a longitudinal axis thereof;
a fixture provided on said spindle for clamping a workpiece;
a linear drive adapted to produce a linear feed motion in a first direction;
an actuator arranged on said linear drive;
wherein said actuator comprises:
a fast drive for driving a tool in an axial direction substantially perpendicular to a workpiece surface by generating a fast advancing motion of said tool in the axial direction;
a guide mechanism coupled at a first axial end to said fast drive and at a second axial end to said tool and configured to allow feeding of the tool in the axial direction of said fast drive, and to substantially resist movement of said tool in a plane perpendicular to the axial direction; and an attenuator coupled to said guide mechanism for damping axial movement of said fast drive;

wherein said guide mechanism further includes biasing means for generating a restoring force acting against said advancing motion and said guide mechanism comprises a ram disposed in a sealed cavity and movably supported within a housing against said restoring force, and further wherein said ram is biased against said fast drive by a fluid pressure.

2. The device of claim 1, wherein said fast drive is configured as a piezo drive.

3. The device of claim 1, wherein said guide mechanism has a static rigidity of at least 100 N/μm, in a plane perpendicular to an axial direction of said guide.

4. The device of claim 1, wherein said ram is supported by first and second spring elements, said spring elements being substantially unyielding in a radial direction of said ram, while allowing deflection in an axial direction of said ram against a spring force of said spring elements.

5. The device of claim 4, wherein said spring elements are configured as leaf springs that have lengthwise ends clamped in holders and that can be moved substantially transversely to a plane wherein said leaf springs extend.

6. The device of claim 5, wherein said spring elements are configured as feeler gauge strips that are clamped in radial direction in crossed arrangement between said holders and said ram.

7. The device of claim 4, wherein said spring elements are configured as disk springs.

8. The device of claim 1, wherein said fast drive further comprises:
a housing,
a pressure-tight space formed within said housing and being sealed in said axial direction by a first diaphragm connected with said ram at said first axial end, and by a second diaphragm connected with said ram at said second axial end;
wherein a fluid pressure can be applied to said pressure-tight space; and
wherein said first diaphragm has a larger surface exposed to said fluid pressure than has said second diaphragm.

9. The device of claim 8, wherein said attenuator is disposed in said pressure-tight space within said housing and comprises a sintered material comprising an open porosity; and
wherein a gap being filled with a damping medium is formed between said attenuator and said first diaphragm.

10. The device of claim 1, wherein a first end of said fast drive opposite said ram is clamped on a holding fixture, and wherein a second end of said fast drive, opposite the first end, is coupled with said ram via a compensating element configured for compensating alignment errors between a longitudinal axis of said ram and a longitudinal axis of said fast drive.

11. The device of claim 1, further comprising a controller for controlling a movement of said actuator, said controller being configured for controlling movement of said actuator relative to a workpiece in response to an angular position of said workpiece and a position of said actuator along a feed direction of said linear drive.

12. The device of claim 11, wherein said controller comprises means for transforming a specified microstructure to be produced on the workpiece into a coordinate-transformed structure defined by polar coordinates, which contains actuation values for said actuator as a function of an angle of rotation of said workpiece and a linear feed of said linear drive in a direction along a workpiece surface.

13. The device of claim 12, wherein said controller comprises means for transforming a specified microstructure to be produced on the workpiece, defined by Cartesian coordinates, to a coordinate-transformed structure defined by polar coordinates, where said actuation values for said actuator are stored as a function of polar coordinates which contain an angle of rotation of said workpiece and a radial distance of said fast tool from an origin of the polar coordinate system.

14. The device of claim 12, wherein the coordinate-transformed structure is stored in a look-up table LUT, from which said electronic controller derives an actuation signal that is supplied to an amplifier for driving the actuator.

15. The device of claim 14, wherein said controller comprises means for interpolating the actuation signal supplied to the amplifier as a function of position increments of the linear feed motion of said linear drive.

16. A device for producing microstructures, comprising:
a spindle which can be rotated about a longitudinal axis thereof;
a fixture provided on said spindle for clamping a workpiece;
an linear drive adapted to produce a linear feed motion in a first direction;
an actuator arranged on said linear drive;
wherein said actuator comprises:
a fast drive for driving a tool in an axial direction substantially perpendicular to a workpiece surface by generating a fast advancing motion of said tool in the axial direction;
a guide mechanism coupled with said fast drive and said tool and configured to allow feeding of the tool in the axial direction of said fast drive, and to substantially resist movement of said tool in a plane perpendicular to the axial direction;
wherein said guide mechanism further includes biasing means for generating a restoring force acting against said advancing motion; and
a controller for controlling a movement of said actuator, said controller being configured for controlling movement of said actuator relative to a workpiece in response to an angular position of said workpiece and a position of said actuator along a feed direction of said linear drive;
wherein said actuator has a first resonant frequency of at least 1500 Hz; and wherein said controller is configured for generating a filtered signal for driving said actuator, said filtered signal being selected from the group formed by a low-pass filtered and a band-pass filtered signal, said filtered signal having an upper cut-off frequency being lower than a resonant frequency of said actuator.

17. An actuator for driving a tool relative to a workpiece that is rotatably mounted on a turning machine for the purpose of producing a microstructured surface, said actuator comprising:
a housing;
a fast drive arranged in said housing for generating a fast advancing motion in an axial direction to drive the tool in said axial direction, said fast drive being coupled to said tool via a ram that is connected at a first axial end to said fast drive and at a second axial end to said tool, said ram being supported within said housing by a guide mechanism that is coupled to said ram and configured to allow movement of the ram in the axial direction and resist movement of the ram in a plane perpendicular to the axial direction, wherein said ram is disposed in a sealed cavity within said housing, said sealed cavity being provided with pressurized fluid for biasing said ram against said advancing motion of said fast drive.

18. The actuator of claim 17, wherein said sealed cavity is defined by a first diaphragm disposed at said first axial end of said ram and a second diaphragm disposed at said second axial end of said ram.

19. The actuator of claim 18, wherein the first diaphragm has a larger surface area exposed to said fluid pressure than said second diaphragm.

20. The actuator of claim 17, further including an attenuator for damping axial movement of said fast drive.

21. The actuator of claim 20, wherein said attenuator is disposed within said sealed cavity for damping axial movement of said ram to thereby dampen axial movement of said fast drive.

22. The actuator of claim 17, wherein said guide mechanism includes biasing means for generating a restoring force against said advancing motion.

23. The actuator of claim 22, wherein said biasing means comprises first and second spring elements that are coupled to said first and second axial ends, respectively, of said ram, said spring elements being substantially unyielding in the plane perpendicular to said axial direction while allowing deflection thereof, and movement of the ram, in the axial direction against the spring force of said spring elements.

* * * * *